(12) United States Patent
Quan et al.

(10) Patent No.: US 8,836,942 B2
(45) Date of Patent: Sep. 16, 2014

(54) OPTICAL COMPONENT WITH A PASSIVE ALIGNMENT MEMBER

(75) Inventors: Albert Khor Wooi Quan, Singapore (SG); Pengyue Wen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 687 days.

(21) Appl. No.: 12/895,818

(22) Filed: Sep. 30, 2010

(65) Prior Publication Data
US 2012/0084049 A1    Apr. 5, 2012

(51) Int. Cl.
| G01B 11/00 | (2006.01) |
| H04N 7/18 | (2006.01) |
| G01B 11/26 | (2006.01) |
| G01B 11/27 | (2006.01) |

(52) U.S. Cl.
CPC ............. *G01B 11/26* (2013.01); *G01B 11/27* (2013.01)
USPC .............................. 356/399; 356/401; 348/95

(58) Field of Classification Search
None
See application file for complete search history.

(56) References Cited

U.S. PATENT DOCUMENTS

| 6,504,611 | B2 * | 1/2003 | Kogan et al. ................... 356/399 |
| 6,678,047 | B1 * | 1/2004 | Miyazaki et al. ............... 356/399 |
| 6,731,438 | B2 * | 5/2004 | Stern et al. ..................... 359/804 |
| 6,733,188 | B2 | 5/2004 | Brezina et al. |
| 6,757,063 | B2 * | 6/2004 | Kogan et al. ................... 356/399 |
| 6,804,422 | B1 | 10/2004 | Bajorins et al. |
| 7,066,661 | B2 | 6/2006 | Therisod |
| 7,203,426 | B2 | 4/2007 | Wu et al. |
| 8,045,164 | B2 * | 10/2011 | Lin et al. ........................ 356/399 |
| 8,259,307 | B2 * | 9/2012 | Lacoste et al. ................. 356/614 |
| 2004/0021865 | A1 * | 2/2004 | Byer et al. ..................... 356/399 |
| 2004/0086011 | A1 * | 5/2004 | Bhandarkar ..................... 372/43 |
| 2004/0169939 | A1 * | 9/2004 | Sawagami et al. ............. 359/811 |
| 2006/0187454 | A1 * | 8/2006 | Shih et al. ..................... 356/400 |
| 2006/0218781 | A1 * | 10/2006 | Nakamura et al. .............. 29/834 |
| 2007/0002911 | A1 * | 1/2007 | Sharma et al. ........... 372/29.022 |
| 2009/0212011 | A1 * | 8/2009 | Abe et al. ........................ 216/52 |
| 2011/0069929 | A1 * | 3/2011 | Bhagavatula et al. .......... 385/88 |
| 2011/0215442 | A1 * | 9/2011 | Shneyder et al. .............. 257/621 |

FOREIGN PATENT DOCUMENTS

TW    522668 B    3/2003

\* cited by examiner

*Primary Examiner* — Gordon J Stock, Jr.

(57) ABSTRACT

Various embodiments of machine vision systems, methods, and devices are disclosed for providing passive alignment of an optical component to an electrical device. One embodiment is a method for passively aligning an optical subassembly to an electrical subassembly. One such method comprises: a machine vision system positioning an optical subassembly relative to an electrical subassembly; the machine vision system capturing an image of the optical subassembly; the machine vision system processing the image to identify an alignment member formed on the optical subassembly; and the machine vision system determining a first position of the optical axis of the optical subassembly based on a second position of the alignment member.

20 Claims, 5 Drawing Sheets

OPTICAL COMPONENT WITH A PASSIVE ALIGNMENT MEMBER

BACKGROUND

Precise alignment between an optical component and an electrical component is critical in the manufacture of various devices, such as, transceivers or other devices. For example, a typical transceiver comprises an electrical subassembly that is aligned with an optical subassembly. The electrical subassembly generally comprises photonic device(s) (e.g., laser, detector, photodiode, etc.) for transmitting optical signals to and receiving optical signals from the optical subassembly. The optical subassembly generally comprises an optical lens for coupling the light signals between the photonic devices and an optical fiber that may be connected to the transceiver.

There are two general manufacturing methods for aligning the electrical subassembly and the optical subassembly: active alignment and passive alignment. In active alignment, for example, a laser on an electrical subassembly is in an active state and the optical elements (e.g., photodetector, lens assembly, optical fiber, etc.) are moved, typically, in a lateral plane (i.e., orthogonal to the optical path) when photoreceiver current is monitored to establish maximal optical coupling. After the alignment is optimized and the optical coupling target is reached, individual components are fixed mechanically to maintain the alignment. This procedure allows for the precise alignment of the optical elements. However, it requires expensive dedicated equipment and sophisticated algorithm/software to implement. In addition, the time to carry out one active alignment is longer when compared with passive alignment. By contrast, the passive alignment procedure is a multi-step alignment process that is performed without turning on any photonic devices such as lasers and photodetectors. In each step, a component is picked, placed and mechanically fixed to its designed position with allowed tolerance. The overall alignment is then determined by the individual component placement accuracy. Passive alignment provides several advantages over active alignment methods, including improved yield and reduced cost, although it does not provide as much accuracy as active alignment methods.

Thus, there remains a need in the art for improved manufacturing solutions for providing passive alignment of optical components.

SUMMARY

Various embodiments of machine vision systems, methods, and devices are disclosed for providing passive alignment of an optical component. One embodiment is a method for passively aligning an optical subassembly to an electrical subassembly. One such method comprises: a machine vision system positioning an optical subassembly relative to an electrical subassembly; the machine vision system capturing an image of the optical subassembly; the machine vision system processing the image to identify an alignment member formed on the optical subassembly; and the machine vision system determining a first position of the optical axis of the optical subassembly based on a second position of the alignment member.

Another embodiment is a machine vision system for providing passive optical alignment of an optical component to a device. One such machine vision system comprises a positioning system, a camera, and a computer. The positioning system positions an optical component relative to a device to which the optical component is to be optically aligned. The camera captures an image of the optical component. The computer is in communication with the camera and the positioning system, and comprises a processor, a memory, and a passive alignment control module stored in memory and executed by the processor. The passive alignment control module comprises instructions for: receiving an image of a surface of the optical component captured by the camera; processing the image to identify an alignment member formed on the surface of the optical component; and calculating a first position of the optical axis of the optical component based on a second position of the alignment member.

A further embodiment is an optical subassembly for passive optical alignment to an electrical subassembly. One such optical subassembly comprises: a substrate having a surface; a generally circular molded lens formed on the surface and having an optical axis; and one or more alignment members formed on the surface from a same material as the molded lens, the alignment members concentrically positioned relative to the optical axis of the molded lens.

BRIEF DESCRIPTION OF THE DRAWINGS

FIG. 2b is top view of the optical subassembly of FIG. 2a.

DETAILED DESCRIPTION

Figure 1:
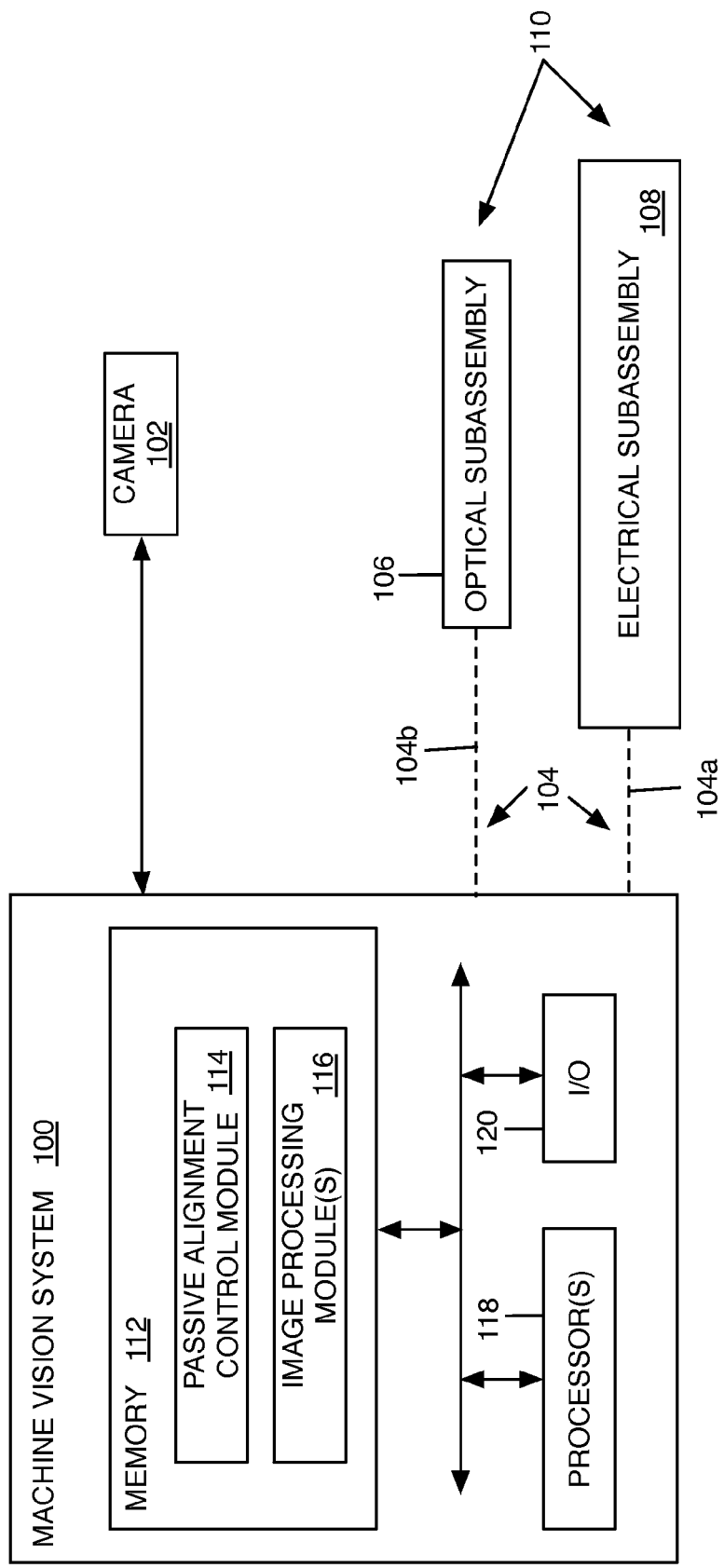
FIG. 1 is a block diagram of an embodiment of a machine vision system for passively aligning a special-purpose optical subassembly to an electrical subassembly.

Various embodiments of machine vision systems, methods, and devices are disclosed for providing improved passive alignment of an optical component. FIG. 1 illustrates an embodiment of an exemplary manufacturing environment for passively aligning an optical subassembly 106 (or other optical components or devices) to an electrical subassembly 108 (or other electronic components or devices). The machine vision system 100 generally comprises an assembly machine having a computer system in communication with an image capture system (e.g., camera 102) and a positioning system 104. Exemplary embodiments of the machine vision system 102 include the assembly machines manufactured by SUSS MicroTec AG or other such systems.

The computer system comprises a processor 110, a memory 112, and one or more input/output devices for interfacing with the positioning system 104 and the camera 102. As known in the art, the positioning system 104 may comprise one or more pick-and-place devices, actuated arms, motorized stages, or other devices (represented in FIG. 1 by reference lines 104a and 104b) that provide mechanical positioning of the optical subassembly 106 and/or the electrical subassembly 106 in accordance with the passive alignment control module(s) 114 and image processing module(s) 116 stored in the memory 112. In this regard, it should be appreciated that the passive alignment control module(s) 114 and the image processing module(s) 116 comprise computer instructions, logic, etc. that may be executed by the processor 118.

One of ordinary skill in the art will appreciate that the passive alignment control module(s) 114 and the image processing module(s) 116 (and any associated or other modules, operation, or functionality described herein) may be implemented in software, hardware, firmware, or a combination thereof. In the embodiment of FIG. 1, the logic is implemented in software or firmware that is stored in the memory 118 and executed by a suitable instruction execution system (e.g., processor(s) 118). In software or firmware embodiments, the logic may be written in any suitable computer language. In hardware embodiments, the logic may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The operation of the machine vision system 100, the passive alignment control module(s) 114, and the image processing module(s) 116 is described below with reference to FIG. 6. Referring to FIGS. 2-5, it should be appreciated that improved passive alignment via the machine vision system 110 may be achieved by incorporating various embodiments of passive alignment member(s) on the optical subassembly 106. In the embodiment illustrated in FIGS. 2a & 2b, an optical subassembly 200 may comprise a generally planar substrate 200 having a surface 204 on which is formed an optical lens 206 having an optical axis 208 and a pair of passive alignment blocks 210a and 210b. The optical lens 206 and the alignment blocks 210a and 210b may be formed from the same material, such as, for example Ultem1010, polycarbonate, or other materials using any desirable mold methods, such as, for example, replication and transfer mold methods. The optical lens 206 may be a generally circular molded lens (or lens array) extending from the surface 204 to define a peripheral edge 212. The optical axis 208 is substantially located in the center of the optical lens 206.

Existing solutions provide passive alignment by capturing an image of the optical lens 206 via the camera 102. Existing machine vision systems calculate the position of the optical axis 208 by processing the captured image, identifying the peripheral edge 212, and calculating the center of the optical lens 206 (i.e., the position of the optical axis 208). Due to the structure, materials, and/or curvature of the optical lens 208, the peripheral edge 212 may be blurred in the captured image, which may produce an undesirable margin of error (e.g., 10-20 microns) in determining the position of the peripheral edge 212 and, therefore, the position of the optical axis 208.

Figure 2B:
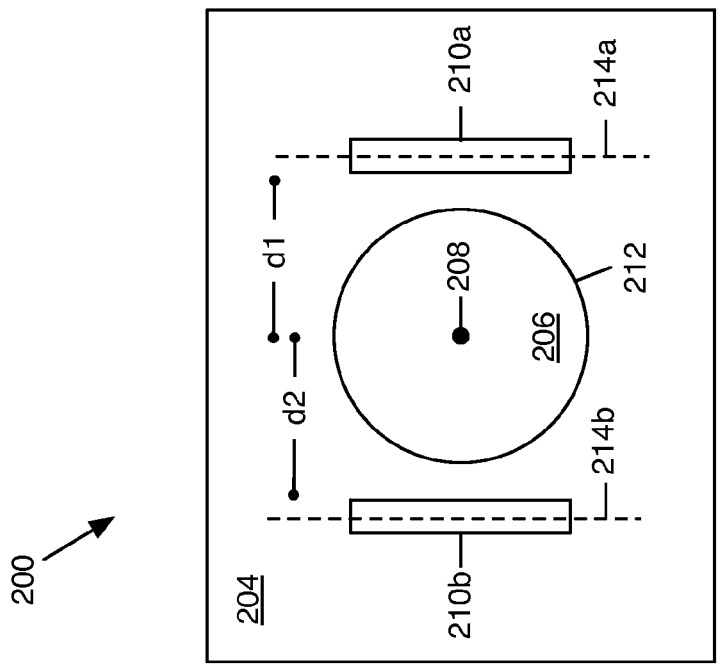
Figure 2A:
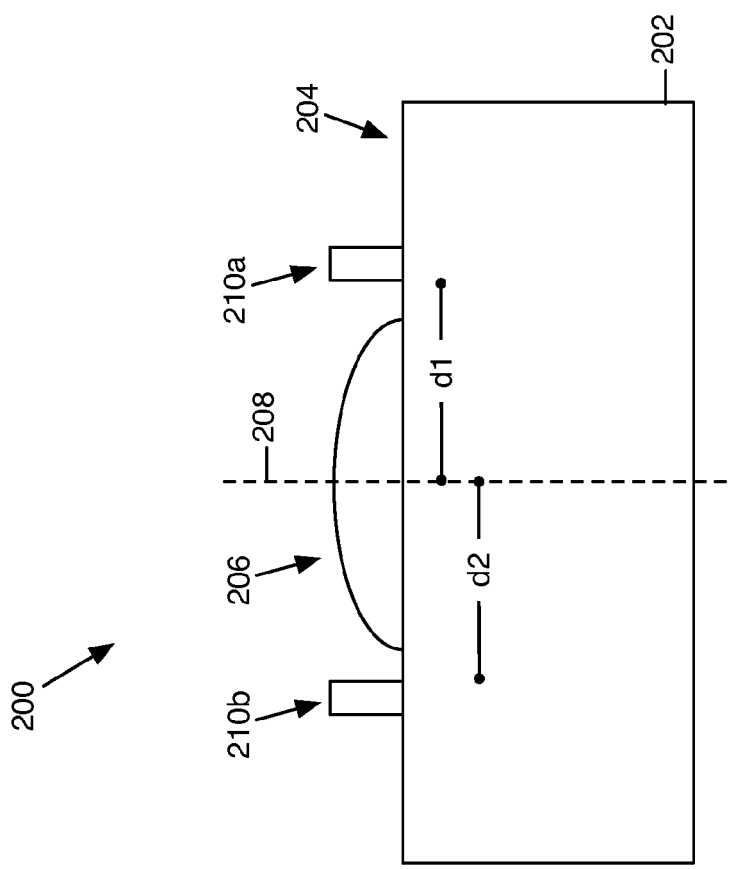
FIG. 2a is a cross-sectional view of an embodiment of the optical subassembly of FIG. 1 in which the alignment member comprises a pair of rectangular blocks.

To more accurately determine the position of the optical axis 208 in the captured image, the alignment blocks 210a and 210b may be formed adjacent the peripheral edge 212. As illustrated in FIG. 2b, the alignment blocks 210a and 210b may be generally rectangular and having respective longitudinal axes 214a and 214b, which are positioned the same distance (d1=d2) from the optical axis 208. The alignment blocks 210a and 210b may extend from the surface 204 with well-defined edges that can be more accurately identified in the captured image by the machine vision system 100. In this manner, the position of the optical axis 208 may be accurately determined based on the position of the well-defined alignment member(s) rather than the blurred peripheral edge 212.

In an embodiment, the alignment blocks 210a and 210b may be formed from materials that are more easily detected in the captured image to further improve accuracy. In other embodiments, the alignment blocks 210a and 210b may be formed from the same material, or other material, as the optical lens 206 and/or during the same molding step (or separate steps) as the optical lens 206. It should be appreciated that any desirable passive alignment member(s), materials, and molding methods may be employed, which enable more accurate calculation of the optical axis 208 based on the detected position of the passive alignment member(s).

Figure 4:
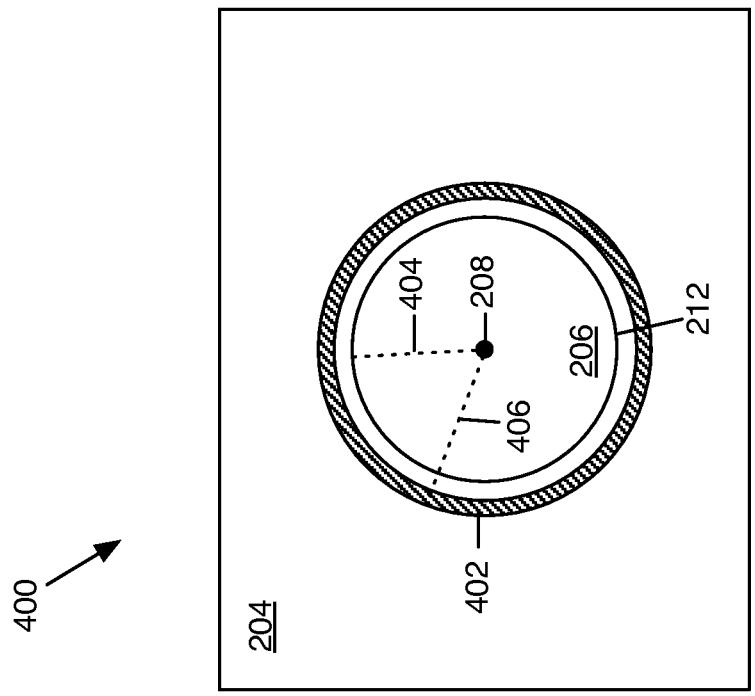
FIG. 4 is a top view of another embodiment of an optical subassembly in which the alignment member comprises a concentric wall.
Figure 3:
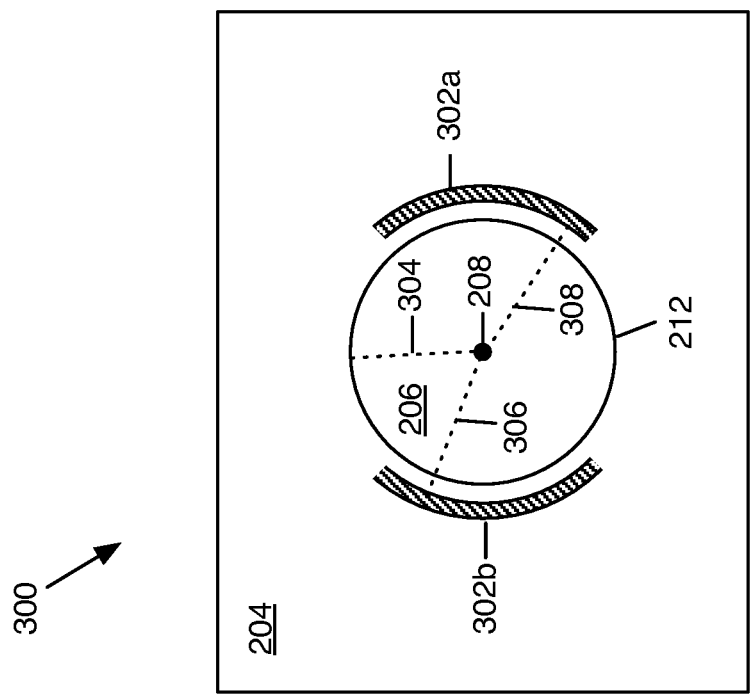
FIG. 3 is a top view of another embodiment of an optical subassembly in which the alignment member comprises a pair of concentric curved blocks.
Figure 5:
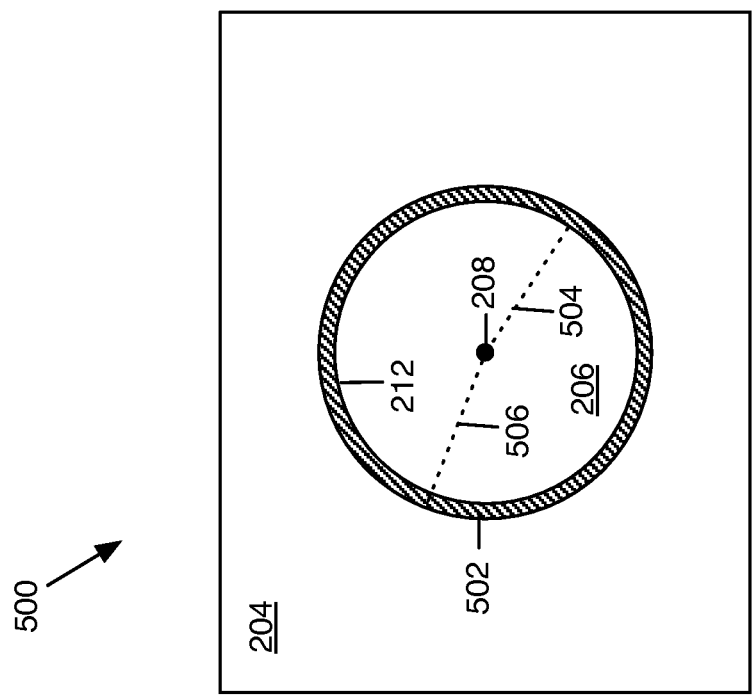
FIG. 5 is a top view of another embodiment of an optical subassembly in which the alignment member is formed by a concentric trench.

Various alternative embodiments of passive alignment member(s) are illustrated in FIGS. 3-5, which may comprise similar materials and be formed in the manner described above. In the embodiment of FIG. 4, the passive alignment member(s) comprise a concentric wall 402 formed on the surface 204. The concentric wall 402 and the optical lens 206 may have co-located centers (as represented by radii 406 and 404, respectively) that are located at the position of the optical axis 208. FIG. 3 illustrates another embodiment in which portions of the concentric wall 402 are omitted to define a pair of curved concentric blocks 302a and 302b having co-located centers (as represented by radii 306 and 308). In a further embodiment, as illustrated in FIG. 5, the concentric structure may comprise a concentric trench 502 formed in the surface 204.

Figure 6:
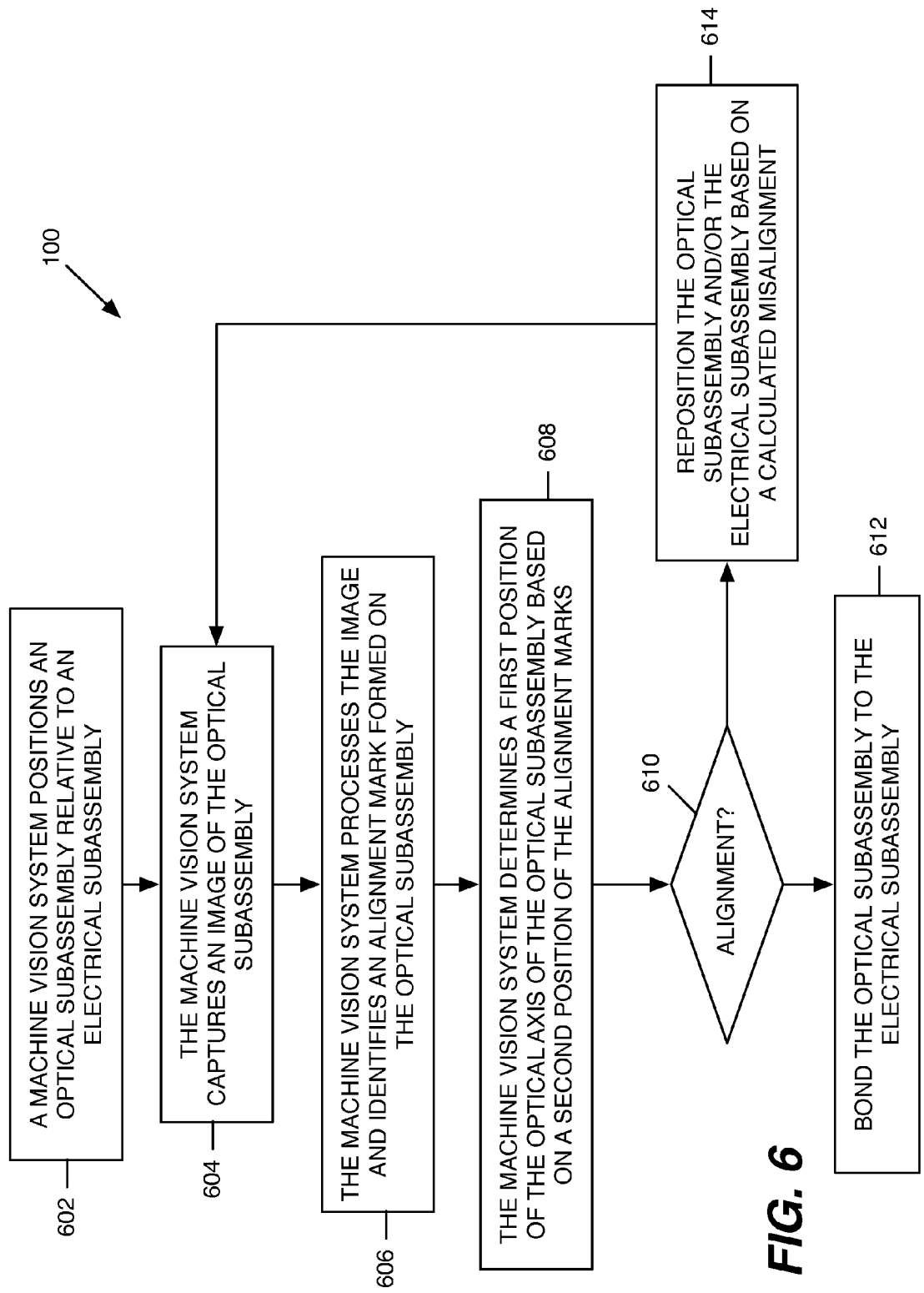
FIG. 6 is a flow chart illustrating the architecture, operation, and/or functionality of an embodiment of the machine vision system of FIG. 1.

FIG. 6 illustrates the architecture, operation, and/or functionality of an embodiment of the machine vision system of FIG. 1. Regardless the specific structure of the passive alignment member(s), at block 602, the positioning system 104 positions the optical subassembly (e.g., optical subassemblies 106, 200, 300, 400, and 500 or other optical component) relative to the electrical subassembly. At block 604, the camera 102 captures an image of the surface 204, including the passive alignment member(s). At block 606, the computer system receives the captured image. The image processing module(s) 116 process the captured image, using any desirable algorithms, and identify the passive alignment member (s). At block 608, the position of the optical axis 208 may be determined based on the geometry of the passive alignment member(s) and the predefined spatial relationship to the optical axis 208. For example, in the embodiment of FIGS. 2a and 2b, the position of the optical axis 208 may be determined by calculating the center point between the two alignment blocks 210a and 210b. In the embodiments of FIGS. 3-5, the position of the optical axis 208 may be determined by calculating the center of the concentric member(s).

At decision block 610, the passive alignment control module(s) 114 determine whether the calculated position of the optical axis 208 is properly aligned with the electrical assembly 108. If aligned (e.g., within an acceptable margin of error), the optical subassembly 106 may be bonded or otherwise attached to the electrical subassembly 108 (at block 612). If not properly aligned, at block 614, the positioning system 104 may reposition the optical subassembly 106 and/or the electrical subassembly 108 based on the calculated misalignment. One or more of blocks 604, 606, 608, and 610 may be repeated until proper alignment is achieved.

It should be appreciated that one or more of the process or method descriptions associated with the flowcharts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the machine vision system 100. Furthermore, the logical functions may be embodied in any computer readable medium for use by or in connection with an instruction execution system, apparatus, or device, such as a computer-based system, processor-containing system, or other system associated with the machine vision system 100 that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention. For example, the private support group functionality described herein may be implemented in any social networking context.

What is claimed is:

1. A method for passively aligning an optical subassembly to an electrical subassembly, the method comprising:
    a machine vision system positioning an optical subassembly relative to an electrical subassembly, the optical subassembly having an upper surface onto which are formed a circular lens and an alignment member, wherein the alignment member is adjacent to an edge of the circular lens;
    the machine vision system capturing an image of the upper surface of the optical subassembly;
    the machine vision system processing the image to identify the alignment member formed on the upper surface of the optical subassembly; and
    the machine vision system determining a first position of the optical axis of the optical subassembly by determining the optical axis of the circular lens formed on the upper surface based on a second position of the alignment member.

2. The method of claim 1, further comprising: the machine vision system determining whether the first position of the optical axis of the optical subassembly is aligned with the electrical subassembly.

3. The method of claim 1, further comprising: the machine vision system repositioning the optical subassembly and the electrical subassembly relative to each other if the first position of the optical axis is not aligned with the electrical subassembly within a predetermined threshold.

4. The method of claim 1, further comprising: the machine vision system bonding the optical subassembly and the electrical subassembly if the first position of the optical axis is aligned with the electrical subassembly.

5. The method of 1, wherein the circular lens comprises a circular molded lens.

6. The method of claim 5, wherein the molded lens and the alignment member are formed from a same material.

7. The method of claim 6, wherein the alignment member and the molded lens are formed on the optical subassembly by one of a replication or transfer mold method.

8. The method of claim 5, wherein the alignment member comprises one of a concentric wall, a concentric trench, and a concentric grating positioned adjacent the periphery of the molded lens relative to the optical axis of the molded lens.

9. The method of claim 5, wherein the alignment member further comprises a pair of concentric block members.

10. A machine vision system for providing passive optical alignment of an optical component to a device, the machine vision system comprising:
    a positioning system for positioning an optical component relative to a device to which the optical component is to be optically aligned, the optical component having an upper surface onto which are formed a circular lens and an alignment member, wherein the alignment member is adjacent to an edge of the circular lens;
    a camera for capturing an image of the upper surface of the optical component;
    a computer in communication with the camera and the positioning system, the computer comprising a processor, a memory, and a passive alignment control module stored in memory and executed by the processor, the passive alignment control module comprising instructions for:
        receiving an image of the upper surface of the optical component captured by the camera;
        processing the image to identify the alignment member formed on the upper surface of the optical component; and
        calculating a first position of the optical axis of the optical component by determining the optical axis of the circular lens formed on the upper surface based on a second position of the alignment member.

11. The machine vision system of claim 10, wherein the passive alignment control module further comprises instructions for determining whether the first position of the optical axis of the optical component is optically aligned with the device.

12. The machine vision system of claim 10, wherein the processing the image to identify the alignment member comprises identifying a pair of parallel rectangular blocks, and wherein the calculating the first position of the optical axis comprises calculating a midpoint between the pair of parallel rectangular blocks.

13. The machine vision system of claim 10, wherein the processing the image to identify the alignment member comprises identifying a circular member, and wherein the calculating the first position of the optical axis comprises calculating a center point of the circular member.

14. An optical subassembly for passive optical alignment to an electrical subassembly, the optical subassembly comprising:
    a substrate having a surface;
    a circular molded lens formed on the surface and having an optical axis; and
    one or more alignment members formed on the surface from a same material as the molded lens, the alignment members concentrically positioned adjacent to the molded lens and relative to the optical axis of the molded lens;
    wherein the one or more alignment members allow calculation of a first position of the optical axis of the optical subassembly by determining the optical axis of the circular molded lens based on a second position of the one or more alignment members.

15. The optical subassembly of claim 14, wherein the molded lens comprises a lens array and the one or more alignment members are formed by one of a replication or transfer mold method.

16. The optical subassembly of claim 14, wherein the one or more alignment members comprise a concentric wall protruding from the surface.

17. The optical subassembly of claim 14, wherein the one or more alignment members comprise a concentric trench adjacent the molded lens.

18. The optical subassembly of claim 14, wherein the one or more alignment members comprise a concentric grating etched on the surface.

19. The optical subassembly of claim 14, wherein the one or more alignment members comprise a pair of concentric block members.

20. The optical subassembly of claim 19, wherein the pair of concentric block members comprises one of a rectangular block member and a curved block member.

\* \* \* \* \*